United States Patent
Hong et al.

(10) Patent No.: US 8,269,438 B2
(45) Date of Patent: Sep. 18, 2012

(54) APPARATUS FOR DRIVING MOTOR OF AIR CONDITIONER AND METHOD FOR DRIVING THE SAME

(75) Inventors: Youngho Hong, Changwon-si (KR);
Yangkwang Choi, Changwon-si (KR);
Wonseok Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 12/851,019

(22) Filed: Aug. 5, 2010

(65) Prior Publication Data

US 2011/0031912 A1    Feb. 10, 2011

(30) Foreign Application Priority Data

Aug. 7, 2009    (KR) .................. 10-2009-0072863
Aug. 7, 2009    (KR) .................. 10-2009-0072864
Aug. 7, 2009    (KR) .................. 10-2009-0072865

(51) Int. Cl.
*H02P 6/16* (2006.01)

(52) U.S. Cl. .............. 318/400.04; 318/268; 318/400.06; 318/432; 318/902; 318/724; 267/140.11; 267/140.15; 310/156.78; 310/156.45; 310/156.53; 363/34; 363/89; 363/44; 363/43

(58) Field of Classification Search .................. 318/268, 318/255, 270, 271, 272, 59, 400.02, 400.06, 318/400.09, 432, 400.04, 609, 632, 400.24, 318/400.34, 437, 802, 434, 284, 611, 902, 318/724, 721, 719, 606, 430, 661, 80; 267/140.11, 267/140.15; 310/156.78, 156.45, 156.53; 429/430, 444; 363/34, 89, 44, 43
See application file for complete search history.

(56) References Cited

U.S. PATENT DOCUMENTS

| | | | |
|---|---|---|---|
| 8,150,580 B2* | 4/2012 | Suzuki | 701/42 |
| 2006/0071621 A1* | 4/2006 | Sugiura et al. | 318/254 |
| 2007/0107973 A1* | 5/2007 | Jiang et al. | 180/443 |

* cited by examiner

*Primary Examiner* — Walter Benson
*Assistant Examiner* — Jorge Carrasquillo
(74) *Attorney, Agent, or Firm* — KED & Associates LLP

(57) ABSTRACT

An apparatus and method for driving a motor of an air conditioner are disclosed. A method for driving a motor of an air conditioner includes driving the motor in response to a predetermined speed command, sequentially detecting first and second mechanical angles in response to the speed command or a reference speed being spaced apart from the speed command by a predetermined range, calculating a maximum speed mechanical angle corresponding to a maximum speed ripple of the motor on the basis of the detected first and second mechanical angles, and compensating for load torque of the motor on the basis of the calculated the maximum speed mechanical angle. As a result, the speed ripple is decreased during the constant speed operation.

13 Claims, 13 Drawing Sheets

(a)

(b)

(a)

(b)

(c)

APPARATUS FOR DRIVING MOTOR OF AIR CONDITIONER AND METHOD FOR DRIVING THE SAME

CROSS-REFERENCE TO RELATED APPLICATION

This application claims the priority benefit of Korean Patent Application No. 10-2009-0072863, filed on 7 Aug. 2009 and Korean Patent Application No. 10-2009-0072864, filed on 7 Aug. 2009, and Korean Patent Application No. 10-2009-0072865, filed on 7 Aug. 2009, respectively, in the Korean Intellectual Property Office, the disclosure of which is incorporated herein by reference.

BACKGROUND OF THE INVENTION

1. Field of the Invention

The present invention relates to an apparatus for driving a motor of an air conditioner and a method for driving the same, and more particularly to an apparatus for driving a motor to decrease a speed ripple when the motor is driven at a constant speed, and a method for driving the same.

2. Description of the Related Art

In general, an air conditioner is arranged at any indoor space or wall of a room, a living room, an office, a store, etc. to adjust temperature, humidity, cleanness, and flow of indoor air, such that a pleasant indoor environment can be maintained in each indoor space.

Generally, the air conditioner is classified into an integration-type air conditioner and a separation-type air conditioner. The integration-type air conditioner has the same function as that of the separation-type air conditioner. However, there are a few differences between them. That is, the integration-type air conditioner integrates a cooling function and a heat-radiation function into one structure, and is directly mounted to a wall via a hole formed in the wall or is directly hung on a window. The separation-type air conditioner includes an indoor unit that is installed indoors to heat/cool indoor air, and an outdoor unit that is installed outdoors to perform a heat-radiation function and a compression function. The indoor unit and the outdoor unit are interconnected via a refrigerant pipe.

On the other hand, a motor is used for a compressor, a fan, etc. of the air conditioner, and a driving device for driving the motor (i.e., a motor driving device) is also used for the air conditioner. The motor driving device receives commercial AC power as an input, converts the commercial AC power into a DC voltage, converts the DC voltage into other commercial AC power having a predetermined frequency, and provides the other commercial AC power to the motor, such that a compressor, a fan, etc. of the air conditioner can be driven.

SUMMARY OF THE INVENTION

Accordingly, the present invention is directed to an apparatus and method for driving a motor for use in an air conditioner that substantially obviate one or more problems due to limitations and disadvantages of the related art.

Therefore, the present invention has been made in view of the above problems, and it is an object of the present invention to provide an apparatus for driving a compressor of an air conditioner so as to minimize a speed ripple of a motor used for driving the compressor.

It is another object of the present invention to provide an apparatus for driving a motor for use in an air conditioner so as to reduce a speed ripple during the constant speed operation.

It is another object of the present invention to provide an apparatus for driving a motor for use in an air conditioner so as to calculate an optimum load pattern table during the constant speed operation.

It is a further object of the present invention to provide an apparatus for driving a motor for use in an air conditioner so as to correctly calculate a maximum speed mechanical angle during the constant speed operation.

In accordance with an aspect of the present invention, the above and other objects can be accomplished by the provision of a method for driving a motor of an air conditioner including driving the motor in response to a predetermined speed command, sequentially detecting first and second mechanical angles in response to the speed command or a reference speed being spaced apart from the speed command by a predetermined range, calculating a maximum speed mechanical angle corresponding to a maximum speed ripple of the motor on the basis of the detected first and second mechanical angles, and compensating for load torque of the motor on the basis of the calculated the maximum speed mechanical angle.

In accordance with another aspect of the present invention, an apparatus for driving a motor for use in an air conditioner includes a motor; an inverter that includes a plurality of switching elements, outputs AC power having a predetermined frequency and a predetermined magnitude by a switching operation of the switching elements, and drives the motor; and a controller configured to drive the motor in response to a predetermined speed command, sequentially detect first and second mechanical angles in response to the speed command or a reference speed being spaced apart from the speed command by a predetermined range, calculate a maximum speed mechanical angle corresponding to a maximum speed ripple of the motor on the basis of the detected first and second mechanical angles, and compensate for load torque of the motor on the basis of the calculated the maximum speed mechanical angle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
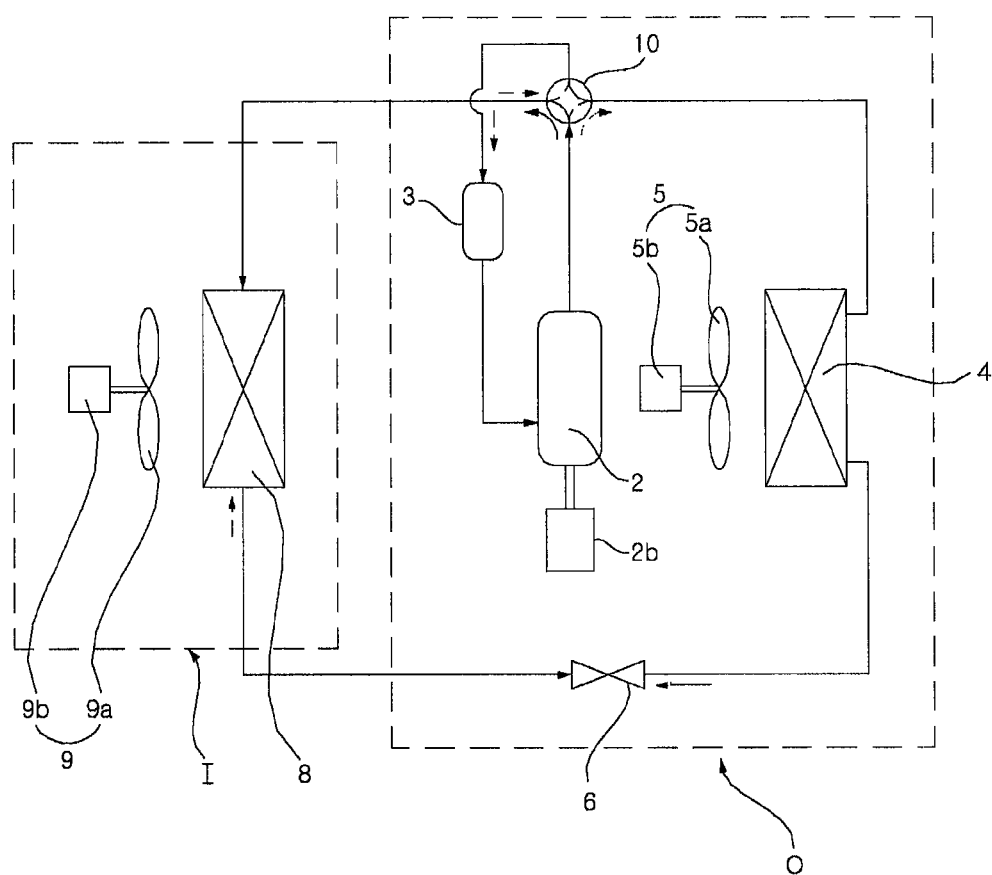
FIG. 1 is a schematic view illustrating an air conditioner according to an embodiment of the present invention.

FIG. 1 is a schematic view illustrating an air conditioner according to an embodiment of the present invention.

Referring to FIG. 1, the air conditioner 50 is generally divided into an indoor unit I and an outdoor unit O.

The indoor unit O may include a compressor 2 for compressing a refrigerant, a compressor driving unit 2b for driving the compressor 2, an outdoor heat-exchanger 4 for radiating heat of the compressed refrigerant, an outdoor ventilator 5 including not only an indoor fan 51 arranged at one side of an outdoor heat-exchanger 4 to expedite heat radiation of refrigerant but also a driving unit 5b to rotate the outdoor fan 5a, an expansion valve 6 for expanding a condensed refrigerant, a cooling/heating switching valve 10 for switching the flow path of the compressed refrigerant, an accumulator 3 for temporarily storing a gaseous refrigerant, removing moisture and foreign matter from the gaseous refrigerant, and transmitting a refrigerant having constant pressure to the compressor 2, and the like.

The indoor unit I may include an indoor heat-exchanger 8, an indoor ventilator 9, and the like. The indoor heat-exchanger 8 is installed indoors to perform the cooling/heating functions. The indoor ventilator 9 includes not only an indoor fan 9a installed at one side of the indoor heat-exchanger 8 to expedite heat radiation of refrigerant but also a driving unit 9b to rotate the indoor fan 9a.

One or more indoor heat-exchangers may be used. The compressor 2 may be at least one of an inverter compressor or a constant-speed compressor.

In addition, if necessary, the air conditioner 50 may be configured as a cooling device for cooling indoor air, or may also be configured as a heat-pump to cool or heat the indoor air.

On the other hand, an apparatus for driving a compressor of an air conditioner according to an embodiment of the present invention may be each driving unit 2b for operating the compressor 2 of the air conditioner, as shown in FIG. 1.

Meanwhile, although FIG. 1 shows one indoor unit I and one outdoor unit O, the apparatus for driving the compressor of the air conditioner according to the embodiment of the present invention is not limited only thereto, and can also be applied not only to a multi-type air conditioner including a plurality of indoor units and a plurality of outdoor units but also to another air conditioner including one indoor unit and a plurality of outdoor units without departing from the principles and spirit of the present invention.

Figure 2:
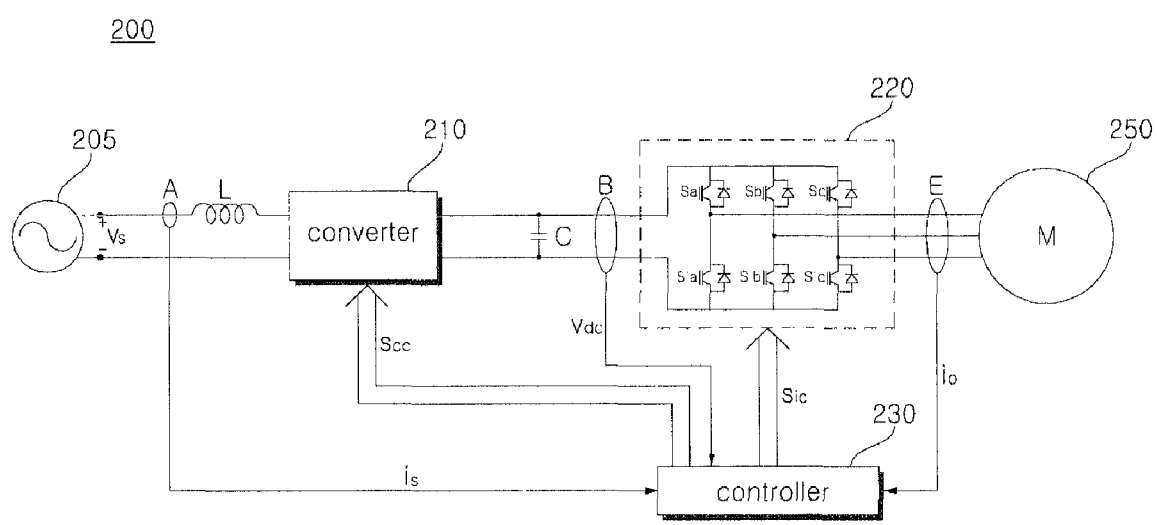
FIG. 2 is a circuit diagram illustrating an apparatus for driving a motor of an air conditioner according to an embodiment of the present invention.

FIG. 2 is a circuit diagram illustrating an apparatus for driving a compressor of an air conditioner according to an embodiment of the present invention.

Referring to FIG. 2, the apparatus for driving the compressor of the air conditioner according to one embodiment of the present invention may include a motor for operating the compressor as previously stated above. Particularly, the compressor driving apparatus may be a load-dependent compressor, operation variation of which is greatly affected by load types, for example, a single-rotary-type compressor. Although a variety of compressors may be applied to the present invention without any restriction, for convenience of description and better understanding of the present invention, the apparatus for driving the compressor according to the embodiment of the present invention will hereinafter be described in detail using a single-rotary compressor as an example.

Referring to FIG. 2, the driving apparatus 200 may include a converter 210, an inverter 220, a controller 230, an input current detection unit A, and an output current detector (E). In addition, the apparatus 200 for driving a motor may further include a capacitor C, a DC-terminal voltage detector B, etc. as necessary.

A reactor L may be located between a commercial AC power source 205 and a converter 210, such that it performs power factor correction or a step-up (or boost) operation. In addition, the reactor L may also limit a harmonic current caused by the high-speed switching of the converter 210.

An input-current detector A may detect an input current ($i_s$) received from the commercial AC power source 205. In order to detect the input current ($i_s$), a current sensor, a current transformer (CT), a shunt resistor, etc. may be used. The detected input current ($i_s$) is a pulse-shaped discrete signal, and may be input to the controller 230 to estimate an input voltage (vs) as well as to generate a converter switching control signal (Scc).

The converter 210 may convert the commercial AC power 205 passing through the reactor L into DC power, and outputs the DC power. Although the commercial AC power 205 of FIG. 2 is shown as a single-phase AC power, it should be noted that the commercial AC power 205 may also be a three-phase AC power as necessary. The internal structure of the converter 210 may be changed according to types of the commercial AC power 205. For example, provided that the commercial AC power 205 is the single-phase AC power, a half-bridge converter wherein two switching elements and four diodes are connected to one another may be employed. Provided that the commercial AC power 205 may be the three-phase AC power, 6 switching elements and 6 diodes may be employed.

The converter 210 may include one or more switching elements, such that it can perform a boosting operation, power factor improvement, and DC-power conversion by the switching operation of the switching elements. Meanwhile, the converter 210 is comprised of a diode and the like, such that it may also perform a rectifying operation without any additional switching operation.

The capacitor C may be connected to an output terminal of the converter 210. The capacitor C smoothes the converted DC power output from the converter 210. For convenience of description, an output terminal of the converter 210 is hereinafter referred to as a DC terminal or a DC link terminal. The DC voltage smoothed in the DC terminal is input to the inverter 220.

The DC-terminal voltage detector B may detect a DC-terminal voltage (Vdc) of both ends of the capacitor C. For this operation, the DC-terminal voltage detector B may include a resistor, an amplifier, and the like. The detected DC-terminal voltage (Vdc) is a pulse-shaped discrete signal, and may be input to the controller 230 to estimate an input voltage (vs) as well as to generate a converter switching control signal (Scc).

The inverter 220 may include a plurality of inverter switching elements, converts the DC power smoothed by on/off operations of the switching elements into a three-phase AC power, and outputs the resultant three-phase AC power to a three-phase motor 250.

The inverter 220 may include upper-arm switching elements (Sa, Sb, Sc) and lower-arm switching elements (S'a, S'b, S'c). In more detail, the inverter 220 includes a total of three pairs (Sa&S'a, Sb&S'b, Sc&S'c) of upper-arm and lower-arm switching elements, wherein the three pairs (Sa&S'a, Sb&S'b, Sc&S'c) are connected in parallel to one another. In addition, one upper-arm switching element (Sa, Sb or Sc) is connected in series to one lower-arm switching element (S'a, S'b or S'c) such that one pair (Sa&S'a, Sb&S'b or Sc&S'c) of upper-arm and lower-arm switching elements is formed. One diode is connected in inverse parallel to one switching element (Sa, S'a, Sb, S'b, Sc or S'c)

The switching elements contained in the inverter 220 receive an inverter switching control signal (Sic) from the controller 230, such that on/off operations of the individual switching elements are performed on the basis of the inverter switching control signal (Sic). As a result, a three-phase AC power having a predetermined frequency is output to the three-phase motor 250.

The output current detector (E) may detect an output current ($i_o$) flowing between the inverter 220 and the three-phase motor 250. In other words, the output current detector (E) detects a current flowing in the motor 250. The output current detector E may detect all output currents of individual phases, or may also detect a one-phase or two-phase output current using three-phase equilibrium.

The output current detector (E) may be located between the inverter 220 and the motor 250. For current detection, a current sensor, a current transformer (CT), a shunt resistor, or the like may be used as the output current detector (E). For example, one end of the shunt resistor may be connected to each of three lower-arm switching elements (S'a, S'b, S'c) of the inverter 220.

The detected output current ($i_o$) is a pulse-shaped discrete signal, may be applied to the controller 230, and may be used to estimate an input current on the basis of the detected output current ($i_o$). In addition, the detected output current ($i_o$) may be used to generate the inverter switching control signal (Sic).

The controller 230 may estimate the position of the motor 250 (i.e., the rotor position of the motor 250) on the basis of the output current ($i_o$) detected by the output current detector (E), and may also calculate the rotating speed of the motor 250. Based on the estimated position and rotating speed of the motor 250, the controller 230 performs a variety of control operations to drive the motor 250 in response to a speed command, generates a pulse-width-modulated inverter switching control signal (Sic), and outputs the resultant inverter switching control signal (Sic).

In this way, the above-mentioned control operation, under the condition that an additional motor position detector element, etc. is not used, for detecting an output current, estimating the position and speed of the motor 250 in response to the output current, and performing feedback control causing the estimated speed to change in response to a speed command is called 'sensorless algorithm-based control'. This sensorless algorithm-based control is not performed during the initial driving of the motor 250, and may start operation when the rotating speed of the motor 250 is equal to or higher than a predetermined value.

In the meantime, the controller 230, in association with the embodiment of the present invention, controls the motor 250 to be driven in response to a predetermined speed command. By the sensorless algorithm, i.e., by an output current ($i_o$) of the motor 250, the controller 230 sequentially detects a first mechanical angle and a second mechanical in response to a speed command or a reference speed spaced apart from the speed command by a predetermined range, and calculates a maximum speed mechanical angle in response to the detected first and second mechanical angles. The controller 230 selects an optimum load pattern table causing a minimal speed ripple from among several load torque patterns calculated in response to the maximum speed mechanical angle.

The controller 230 may compensate for load torque of the motor 250 in response to the selected optimum load pattern table. Therefore, during the constant speed operation of the motor 250, the speed ripple caused by the load torque can be simply and greatly reduced.

On the other hand, the controller 230 may also determine whether the above-mentioned detected first and second mechanical angles are within a normal range. If the first and second mechanical angles are not within the normal range, the controller 230 corrects at least one of the first or second mechanical angles, and calculates a maximum speed mechanical angle at a predetermined speed or less on the basis of the first and second mechanical angles.

For example, the controller 230 estimates the position of a rotor on the basis of the output current ($i_o$) of the motor 250, such that it sequentially detects the first and second mechanical angles of the motor 250. In addition, by means of the sequentially detected first and second mechanical angles, the controller 230 calculates a maximum speed mechanical angle corresponding to maximum speed ripple of the motor 250. In this case, the maximum speed mechanical angle may be calculated using an average value of the first and second mechanical angles. Meanwhile, provided that the sequentially detected first and second mechanical angles are not sequential, i.e., provided that the first mechanical angle is higher than the second mechanical angle, it is preferable that the first mechanical angle be compensated for in such a manner that the second mechanical angle becomes higher than the first mechanical angle. A detailed description thereof will be described later with reference to FIG. 3.

In the meantime, in association with the embodiment of the present invention, the controller 230 controls the motor 250 to be driven in response to a predetermined speed command. By the sensorless algorithm, i.e., by an output current ($i_o$) of the motor 250, the controller 230 sequentially detects a first mechanical angle and a second mechanical angle in response to a speed command or a reference speed spaced apart from the speed command by a predetermined range, and determines whether the detected first and second mechanical angles are within a normal range. If the detected first and second mechanical angles are not within the normal range, the controller 230 corrects at least one of the first or second mechanical angles, and calculates a maximum speed mechanical angle at a predetermined speed or less on the basis of the resultant first and second mechanical angles.

In addition, in order to remove a load torque component of the motor 250 for driving a compressor having an operation range greatly affected by load, the controller 230 may compensate for load torque of the motor 250 using a predetermined load torque pattern formed based on the calculated maximum speed mechanical angle.

For example, the controller 230 estimates the position of a rotor on the basis of the output current ($i_o$) of the motor 250, such that it sequentially detects the first and second mechanical angles of the motor 250. In addition, by means of the sequentially detected first and second mechanical angles, the controller 230 calculates a maximum speed mechanical angle corresponding to a maximum speed ripple of the motor 250. In this case, the maximum speed mechanical angle may be calculated using an average of the first and second mechanical angles. Meanwhile, provided that the sequentially detected first and second mechanical angles are not sequential, i.e., provided that the first mechanical angle is higher than the second mechanical angle, it is preferable that the first mechanical angle be compensated for in such a manner that the second mechanical angle becomes higher than the first mechanical angle.

In the meantime, in association with the embodiment of the present invention, the controller 230 controls the motor 250 to be driven in response to a predetermined speed command. By the sensorless algorithm, i.e., by an output current ($i_o$) of the motor 250, the controller 230 sequentially detects a first mechanical angle and a second mechanical angle in response to a speed command or a reference speed spaced apart from the speed command by a predetermined range, and calculates a maximum speed mechanical angle in response to the detected first and second mechanical angles.

The controller 230 may calculate a pattern matching angle for applying a load pattern table in response to the calculated maximum speed mechanical angle. Specifically, the controller 230 calculates a pattern matching compensation angle causing a minimal speed ripple using the maximum speed mechanical angle and a predetermined matching angle, and calculates a final pattern matching angle in response to the predetermined pattern matching angle and the pattern matching compensation angle. As a result, the speed ripple caused by load torque can be decreased. If the speed ripple is increased by an assembly error between the compressor and the motor 250, the controller 230 uses the pattern matching compensation angle, resulting in great reduction in the speed ripple.

On the other hand, the controller 230 may control the switching operation of the inverter 220. For this operation, the controller 230 receives the output current ($i_o$) detected by the output current detector (E), generates the inverter switching control signal (Sic), and outputs it to the inverter 220. The inverter switching control signal (Sic) may be a switching control signal for Pulse Width Modulation (PWM). A detailed description of the inverter switching control signal (Sic) output of the controller 230 will hereinafter be described with reference to FIG. 3.

In the meantime, the controller 230 may also perform the switching operation of the converter 210. For this operation, the controller 230 receives a DC-terminal voltage (Vdc) detected by the DC-terminal voltage detector (B) as an input, generates a converter switching control signal (Scc), and outputs it to the converter 210. The converter switching control signal (Scc) may be a PWM switching control signal.

The three-phase motor 250 includes a stator and a rotor. AC power of each phase having a predetermined frequency is applied to a coil of a stator of each phase such that the rotor starts rotating. Various types of motors 250 may be used, for example, a brushless DC (BLDC) motor, a Synchronous Reluctance Motor (synRM), etc.

The three-phase motor 250 may be a motor for use in a compressor of the air conditioner. Specifically, the three-phase motor 250 may be a single-rotary compressor causing serious load variation.

In the meantime, the controller 230 may be an outdoor-unit controller (hereinafter referred to as an outdoor controller), and may further communicate with an indoor-unit controller (hereinafter referred to as an indoor controller) capable of being separately installed in the indoor unit as necessary. The outdoor controller receives an operation command by communicating with the indoor controller, and decides a speed command value on the basis of the received operation command. A detailed description of the speed command value will be described later.

In addition, the controller 230 of the motor driving apparatus 200 of the air conditioner may simultaneously control not only a motor for a fan used in the outdoor unit but also the motor 250 for the compressor.

Figure 3:
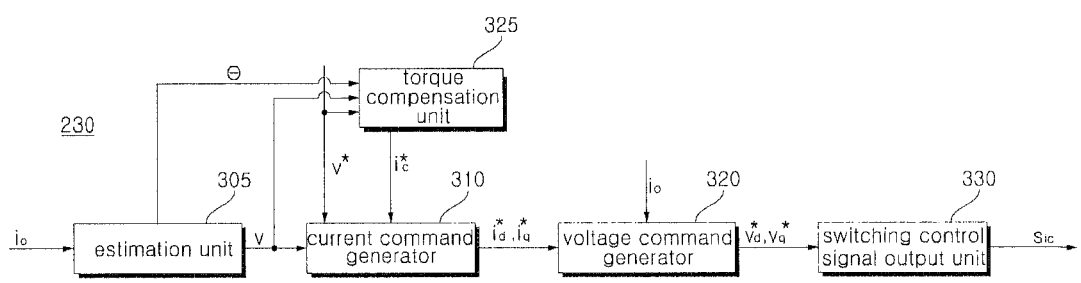
FIG. 3 is a block diagram illustrating internal constituent elements of a controller shown in FIG. 2.

FIG. 3 is a block diagram illustrating internal constituent elements of a controller shown in FIG. 2

Referring to FIG. 3, the controller 230 may further include an estimation unit 305, a current command generator 310, a voltage command generator 320, a torque compensation unit 325, and a switching control signal output unit 330.

On the other hand, although not shown in FIG. 3, the controller 230 may further include an axis converter for converting a three-phase output current ($i_o$) into a d-axis or q-axis current or converting the d-axis or q-axis current into a three-phase output current ($i_o$).

The estimation unit 305 estimates a speed (v) of the motor on the basis of the detected output current ($i_o$). For example, a mechanical equation of the motor 250 is compared with an electrical equation, such that the estimation unit 305 can estimate the speed (v) of the motor.

In addition, the estimation unit 305 may also estimate the position of the rotor on the basis of the detected output current ($i_o$). The estimation unit 305 can estimate an electrical or mechanical angle of the motor 250 through the rotor position. Generally, the relationship between the mechanical angle and the electrical angle is represented by the following Equation 1.

$$\theta_{Me} = \frac{\text{Number of Poles}}{2} \theta_e \qquad [\text{Equation 1}]$$

In Equation 1, $\theta_{Me}$ is a mechanical angle, and $\theta_e$ is an electrical angle. For example, if the number of poles of the motor 250 is 6, the relationship denoted by '$\theta_{Me}=3\theta_e$' is provided. If the number of poles of the motor 250 is 4, the relationship denoted by '$\theta_{Me}=2\theta_e$' is provided.

That is, if the number of poles of the motor 250 is 6, three electrical angles ($3\theta_e$), each of which has an angle of 120°, are present in the mechanical angle ($\theta_{Me}$) of 360°. If the number of poles of the motor 250 is 4, two electrical angles ($2\theta_e$), each of which is 180°, are present in the mechanical angle ($\theta_{Me}$) of 360°.

The current command generator 310 generates current command values (i*d and i*q) on the basis of the estimated speed (v) and the speed command value (v*). For example, the current command generator 310 performs Proportional Integral (PI) control on the basis of a difference between the estimated speed (v) and the speed command value (v*), such that it can generate the current command values (i*d and i*q). For this operation, the current command generator 310 may include a PI controller (not shown). Also, the current command generator 310 may further include a limiter (not shown) preventing a level of each current command value (i*d or i*q) from exceeding an allowed range.

The voltage command generator 320 generates voltage command values (v*d and v*q) on the basis of the detected output current ($i_o$) and the calculated current command values (i*d and i*q). For example, the voltage command generator 320 performs PI control on the basis of a difference between the detected output current (io) and the calculated current command values (i*d and i*q), such that it can generate the voltage command values (v*d and v*q). For this operation, the voltage command generator 320 may include a PI controller (not shown). Also, the voltage command generator 320 may further include a limiter (not shown) for allowing a level of each voltage command value (v*d or v*q) not to exceed an allowed range.

The torque compensation unit 325 sequentially detects a first mechanical angle ($\theta_{Me1}$) and a second mechanical angle ($\theta_{Me2}$) in response to a speed command or a reference speed spaced apart from the speed command by a predetermined range, and calculates a maximum speed mechanical angle ($\theta_M$) in response to the detected first and second mechanical angles. The controller 230 selects an optimum load pattern table causing a minimal speed ripple from among several load torque patterns in response to the maximum speed mechanical angle.

On the other hand, the torque compensation unit 325 compares the first mechanical angle ($\theta_{Me1}$) with the second mechanical angle ($\theta_{Me2}$). If the first mechanical angle ($\theta_{Me1}$) is higher than the second mechanical angle ($\theta_{Me2}$), the torque compensation unit 325 may compensate for at least one of the first or second mechanical angles ($\theta_{Me1}$ and $\theta_{Me2}$), and may also calculate a maximum speed mechanical angle ($\theta_M$) corresponding to the maximum speed ripple on the basis of the compensated mechanical angle. As stated above, the torque compensation unit 325 determines whether an abnormal state occurs in a plurality of mechanical angles sequentially calculated during the constant speed operation, and corrects the abnormal state, such that it can correctly calculate a maximum speed mechanical angle ($\theta_M$) during the constant speed operation.

On the other hand, the torque compensation unit 325 generates a compensation current command value (i*c) in response to the calculated maximum speed mechanical angle ($\theta_M$), such that can compensate for the speed ripple caused by load torque during the constant speed operation. For example, the compensation current command value (i*c) at the calculated maximum speed mechanical angle ($\theta_M$) may correspond to a minimum value.

Therefore, the current command generator 310 adds the current command values (i*d and i*q) to the aforementioned compensation current command value (i*c) so as to generate a final current command value, and outputs the final current command value. Hence, the current command for compensating for load torque is changed, such that the voltage commands (v*d and v*q) and the output signal (Sic) of the switching control signal output unit 330 are changed. As a result, a predetermined pattern can be correctly applied to load torque compensation, and the speed ripple caused by the load torque during the constant speed operation can be simply and greatly reduced.

The switching control signal output unit 330 generates a PWM switching control signal (Sic) for the inverter 220 on the basis of the voltage command values (v*d and v*q), and outputs the PWM switching control signal (Sic) to the inverter 220. Therefore, the switching elements (Sa, S'a, Sb, S'b, Sc, S'c) contained in the inverter 220 perform the on/off switching operation.

FIGS. 4(a) and 4(b) are graphs illustrating load torque varying with a motor speed.

FIG. 4(a) shows the rotating speed of the motor 250. As shown in FIG. 5(a), during the initial driving, the rotating speed of the motor 250 may be gradually increased up to a predetermined rotating speed, and the predetermined rotating speed may be maintained at a specific halt frequency for a predetermined period of time. After the lapse of the predetermined period of time, the rotating speed of the motor 250 may be increased again on the basis of the predetermined rotating speed. For example, the halt frequency may be 35 Hz.

In accordance with the embodiment of the present invention, upon receiving a predetermined speed command at the halt frequency, the controller 230 sequentially detects the first and second mechanical angles in response to a speed command or a reference speed spaced apart from the speed command by a predetermined range, and correctly detects the first and second mechanical angles as described above.

FIG. 4(b) shows the speed ripple generated when the motor 250 is driven in response to a predetermined speed command. For example, assuming that the predetermined speed command is denoted by 'v1', the speed ripple curve shows the speed estimation value (v*1) estimated by the aforementioned estimation unit 305, and may be shown as a periodic curve such as a sine wave in response to the mechanical angle ($\theta_{Me}$) of 360°.

In this case, assuming that the motor 250 is a single-rotary compressor, the load of the motor 250 may be represented by a load torque (TL) according to one period of suction and discharge.

On the other hand, in FIG. 4(b), a maximum speed mechanical angle ($\theta_M$) is a mechanical angle corresponding to a specific point ($v_{1p}$) where the speed estimation value (v*1) reaches a maximum speed estimation value. A variety of methods for calculating the maximum speed mechanical angle ($\theta_M$) may be employed. For example, the maximum speed mechanical angle ($\theta_M$) may be calculated using not only two reference speeds that are spaced apart from the speed command (v1) by a predetermined range, but also the proportional relationship of the two reference speeds. As another example, the maximum speed mechanical angle ($\theta_M$) may be calculated not only using the speed command (v1) or one reference speed spaced apart from the speed command (v1) by a predetermined range, but also using the proportional relationship (i.e., an average value of the maximum speed mechanical angle ($\theta_M$) and one reference speed). Although the embodiment of the present invention has exemplarily described that the maximum speed mechanical angle ($\theta_M$) is calculated using the average value, the scope or spirit of the present invention is not limited only thereto and can also be applied to other examples as necessary.

FIGS. 5(a) to 5(d) are graphs illustrating properties of the embodiments of the present invention.

FIG. 5(a) shows a speed curve in response to the mechanical angle of FIG. 4(b). That is, FIG. 5(a) shows a method for calculating the maximum speed mechanical angle ($\theta_M$) using the speed command (v1) and one reference speed (vr1) spaced apart from the speed command (v1) by a predetermined range. P1 and P2 denote predetermined positions that are matched to the reference speed (vr1) on the estimation speed (v1) curve. Meanwhile, on the estimation speed (v1) curve, Pa is a predetermined position matched to a first reference speed (vr1), and Pb is a predetermined position matched to a second reference speed (vr2).

FIG. 5(b) shows first and second mechanical angles ($\theta_{a1}$ and $\theta_{a2}$) at P1 and P2 indicating positions matched to reference speeds spaced apart from the speed command by a predetermined range. In consideration of the magnitudes of the first and second mechanical angles ($\theta_{a1}$ and $\theta_{a2}$) shown in FIG. 5(b), it can be readily recognized that the first and second mechanical angles ($\theta_{a1}$ and $\theta_{a2}$) are sequentially detected. Therefore, the maximum speed mechanical angle ($\theta_M$) can be calculated by the following Equation 2.

$$\Theta_M = \frac{\Theta_{a1} + \Theta_{a2}}{2} \qquad \text{[Equation 2]}$$

As can be seen from Equation 2, the maximum speed mechanical angle ($\theta_M$) is an average value of the first and second mechanical angles ($\theta_{a1}$ and $\theta_{a2}$).

FIG. 5(c) shows first and second mechanical angles ($\theta_{b1}$ and $\theta_{b2}$) at P1 and P2 indicating positions matched to reference speeds spaced apart from the speed command by a predetermined range. Compared to FIG. 5(b), in relation to the first and second mechanical angles ($\theta_{b1}$ and $\theta_{b2}$) sequentially detected as shown in FIG. 5(c), the first mechanical angle ($\theta_{b1}$) is higher than the second mechanical angle ($\theta_{b2}$). $\theta_{b1}$ is greater than $\theta_{b2}$ for the following reason. Under the condition that the position of the mechanical angle is continuously repeated by a period of 360°, the mechanical angle period is repeated between contact points to the corresponding reference speed (vr1). In this case, when calculating the maximum speed mechanical angle ($\theta_M$) using only an average value of the first and second mechanical angles ($\theta_{b1}$ and $\theta_{b2}$) as described above, an incorrect maximum speed mechanical angle ($\theta_M$) is obtained.

In accordance with the embodiment of the present invention, in order to correct the incorrect maximum speed mechanical angle ($\theta_M$), assuming that the first mechanical angle ($\theta_{b1}$) is higher than the second mechanical angle ($\theta_{b2}$) and a difference between the first mechanical angle ($\theta_{b1}$) and the angle of 360° is less than the second mechanical angle ($\theta_{b2}$) (i.e., |$\theta_{b1}$−360°|<$\theta_{b2}$), the first mechanical angle ($\theta_{b1}$) is compensated for.

In other words, the maximum speed mechanical angle ($\theta_M$) can be represented by the following Equation 3.

$$\Theta_M = \frac{(\Theta_{b1} - 360°) + \Theta_{b2}}{2} \qquad \text{[Equation 3]}$$

In Equation 3, the maximum speed mechanical angle ($\theta_M$) is identical to an average of one value of ($\theta_{b1}$−360°) and the second mechanical angle ($\theta_{a2}$).

FIG. 5(d) shows first and second mechanical angles ($\theta_{c1}$ and $\theta_{c2}$) at P1 and P2 indicating positions matched to reference speeds spaced apart from the speed command by a predetermined range.

Compared to FIG. 5(b), in relation to the first and second mechanical angles ($\theta_{c1}$ and $\theta_{2}$) sequentially detected as shown in FIG. 5(d), the first mechanical angle ($\theta_{b1}$) is higher than the second mechanical angle ($\theta_{b2}$). The reason of $\theta_{b1}$ is greater than $\theta_2$ for the following reason. Under the condition that the position of the mechanical angle is continuously repeated by a period of 360°, the mechanical angle period is repeated between contact points to the corresponding reference speed (vr1). In this case, when calculating the maximum speed mechanical angle ($\theta_M$) using only an average value of the first and second mechanical angles ($\theta_{c1}$ and $\theta_{c2}$) as described above, an incorrect maximum speed mechanical angle ($\theta_M$) is obtained.

In accordance with the embodiment of the present invention, in order to correct the incorrect maximum speed mechanical angle ($\theta_M$), assuming that the first mechanical angle ($\theta_{c1}$) is higher than the second mechanical angle ($\theta_{c2}$) and a difference value between the first mechanical angle ($\theta_{c1}$) and the angle of 360° is less than the second mechanical angle ($\theta_{c2}$) (i.e., |$\theta_{c1}$−360°|>$\theta_{c2}$), the second mechanical angle ($\theta_{bc2}$) is compensated for.

In other words, the maximum speed mechanical angle ($\theta_M$) can be represented by the following Equation 4.

$$\Theta_M = \frac{\Theta_{c1} + (\Theta_{c2} + 360°)}{2} \qquad \text{[Equation 4]}$$

In Equation 4, the maximum speed mechanical angle ($\theta_M$) is identical to an average of the first mechanical angle ($\theta_{c1}$) and one value of ($\theta_{c2}$+360°).

As described above, at least one of the detected first or second mechanical angles is compensated for such that a maximum speed mechanical angle during the constant speed operation can be correctly calculated.

Figure 6:
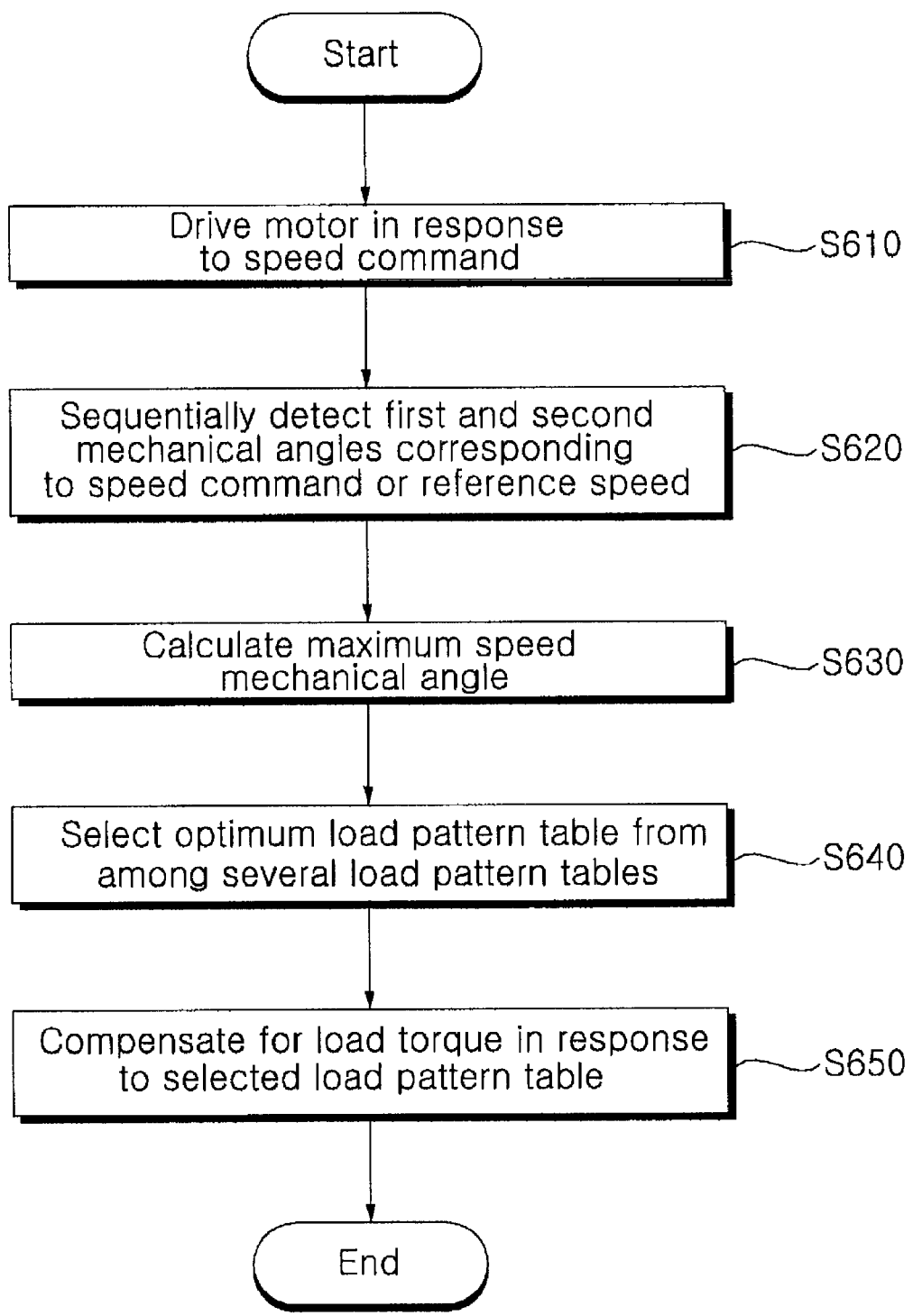
FIG. 6 is a flowchart illustrating a method for driving a motor according to an embodiment of the present invention.
Figure 7:
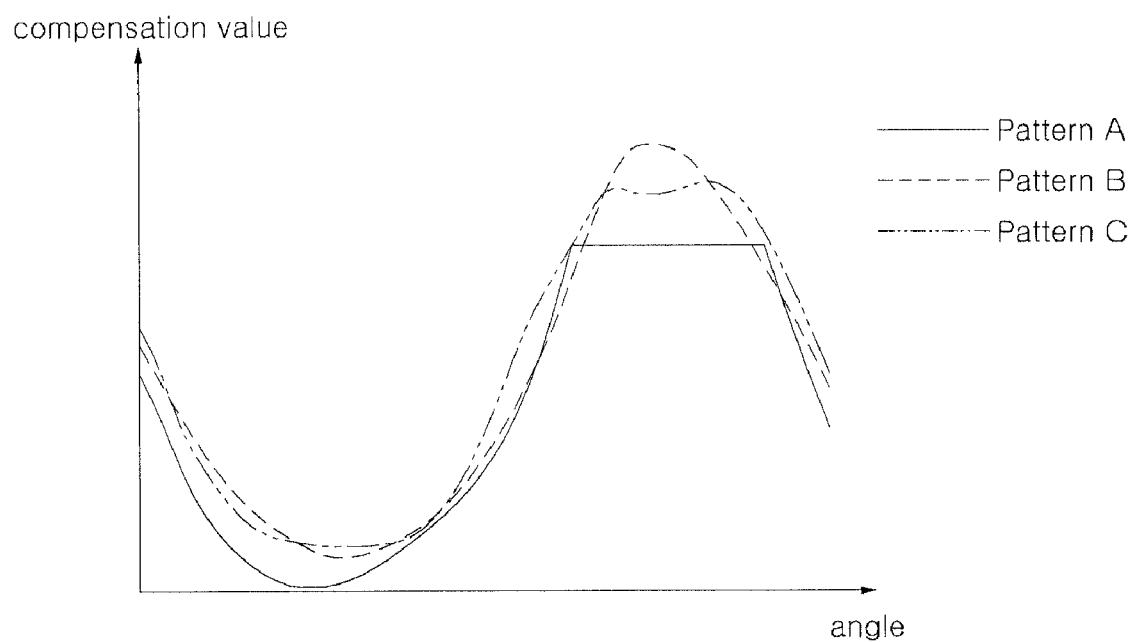
FIGS. 7 and 8 are graphs illustrating the motor driving method shown in FIG. 6.
Figure 8:
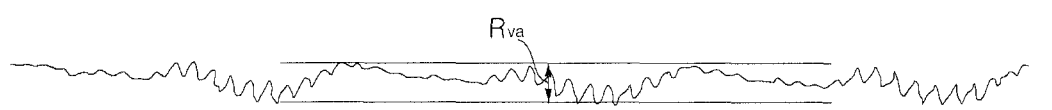
Figure 8:
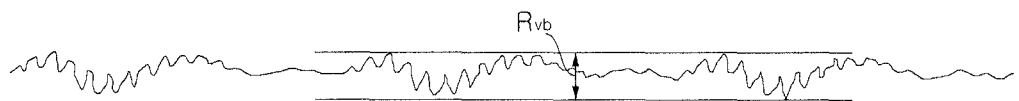
Figure 8:
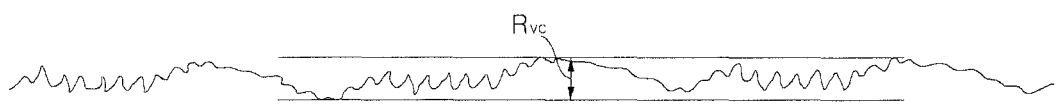

FIG. 6 is a flowchart illustrating a method for driving a motor according to an embodiment of the present invention. FIGS. 7 and 8 are graphs illustrating the motor driving method shown in FIG. 6.

Referring to FIG. 6, the controller 230 drives the motor 250 in response to the speed command (v*) at step S610. For example, the controller 230 may control the motor 250 to be driven by a specific speed command corresponding to a halt frequency (about 35 Hz). Therefore, the controller 250 outputs the corresponding inverter switching control signal (Sic) to the inverter 220.

Figure 5:
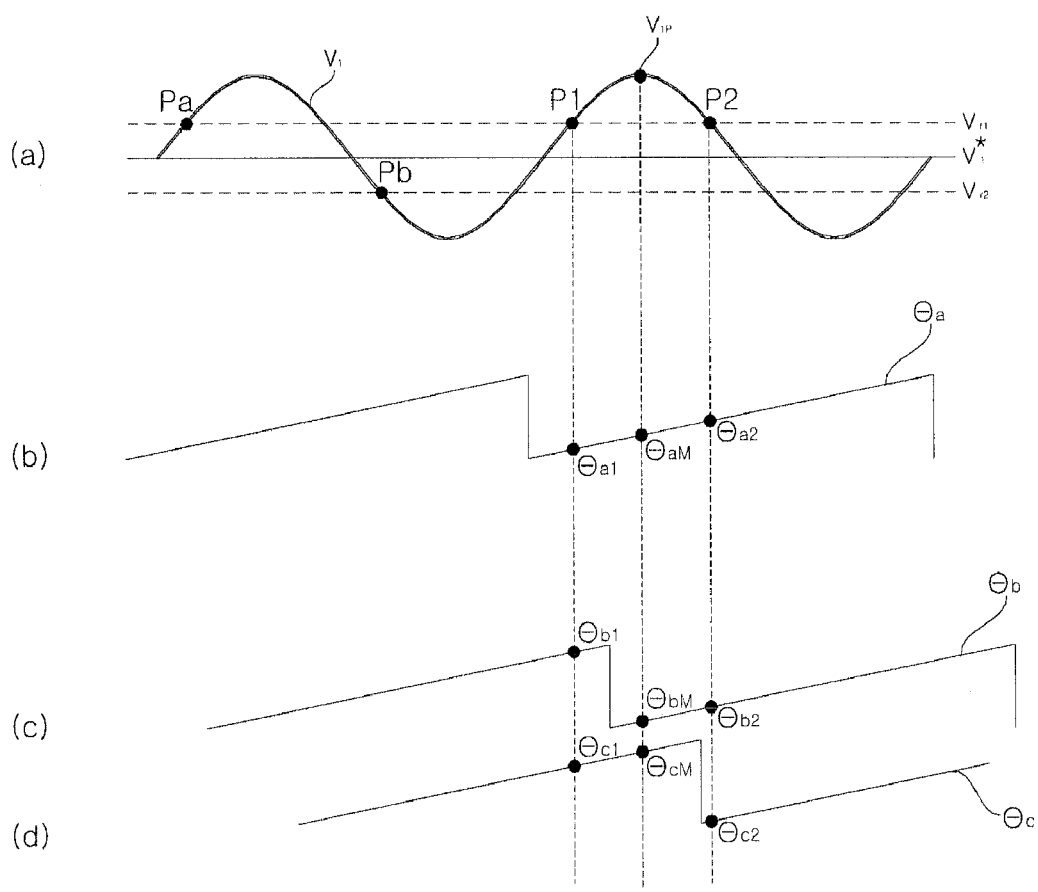
FIGS. 5(a) to 5(d) are graphs illustrating properties of the embodiments of the present invention.

Thereafter, the controller 230 sequentially detects first and second mechanical angles in response to a speed command and a reference speed spaced apart from the speed command by a predetermined range at step S620. The controller 230 recognizes the reference speed (vr1) spaced apart from the speed command (v*1) by a predetermined range as shown in FIG. 5, and detects the first and second mechanical angles at P1 and P2 corresponding to the reference speed (vr1). Such detection of the first and second mechanical angles may be carried out in the estimation unit 305 and the torque compensation unit 325.

Thereafter, the controller 230 calculates a maximum speed mechanical angle ($\theta_M$) at step S630. As can be seen from Equation 2, the maximum speed mechanical angle ($\theta_M$) may be calculated as an average of the first and second mechanical angles as necessary.

In response to the calculated maximum speed mechanical angle ($\theta_M$), the controller 230 may select an optimum load pattern table causing a minimal speed ripple from among a plurality of load torque patterns at step S640.

For example, the controller 230, especially, the torque compensation unit 325, selects a maximum speed mechanical angle ($\theta_M$) having a minimal value from among several load torque patterns, matches the selected maximum speed mechanical angle ($\theta_M$) to a minimum value from among the corresponding predetermined load torque patterns, and outputs a compensation current command value (i*c) in response to the corresponding load torque pattern. Therefore, the current command generator 310 adds the output current command values (i*d and i*q) and the aforementioned compensation current command value (i*c), and generates/outputs the final current command value. As a result, the current command for compensating for the load torque is changed, such that the voltage commands (v*d and v*q) and the output (sic) of the switching control signal output unit are changed. In this way, switching control signals for individual load torque patterns are output to drive the motor 250, the speed of the motor 250 is estimated, and the load torque pattern causing a minimal ripple is selected.

FIG. 7 shows a plurality of load patterns, i.e., load patterns A, B and C, however the scope and types of such load patterns of the present invention are not limited only thereto, and a variety of load patterns may be predetermined as necessary.

FIG. 8 shows the speed estimated by the estimation unit 305 in response to the load patterns of FIG. 7, and also shows individual speed ripples.

FIG. 8(a) shows the speed ripple ($R_{va}$) in response to the load pattern A, FIG. 8(b) shows the speed ripple ($R_{vb}$) in response to the load pattern B, and FIG. 8(c) shows the speed ripple ($R_{vc}$) in response to the load pattern C.

In comparison with individual speed ripples, the relationship of $R_{va}<R_{vb}<R_{vc}$ is provided, such that the controller 230 determines the load pattern A to be an optimum load pattern. In conclusion, a predetermined pattern can be correctly applied to load torque compensation, such that the speed ripple caused by load torque during the constant speed operation can be simply and greatly decreased.

On the other hand, the controller 230 compensates for the load torque in response to the selected load pattern table at step S650. As described above, the controller 230 outputs the compensation current command value (i*c). Therefore, the current command generator 310 adds the output command values (i*d and i*q) and the aforementioned compensation current command value (i*c), and generates the final current command value using the added result. As a result, the current command for compensating for load torque is changed, such that the voltage commands (v*d and v*q) and the output (Sic) of the switching control signal output unit 330 are changed.

In the meantime, although not shown in FIG. 6, one step for correcting the detected first and second mechanical angles may be further inserted between the step S620 and the step S630 as necessary.

For example, in relation to the sequentially detected first and second mechanical angles, if the second mechanical angle is higher than the first mechanical angle, this means a normal state, such that a maximum speed mechanical angle is calculated as an average of the first and second mechanical angles using Equation 2.

Next, if the first mechanical angle is higher than the second mechanical angle, this means an abnormal state, such that the controller 230 can compensate for either one of the first and second mechanical angles. In addition, the controller 230 can calculate a maximum speed mechanical angle ($\theta_M$) on the basis of the compensated first and second mechanical angles.

For example, if a difference value between the first mechanical angle and the angle of 360° is less than the second mechanical angle (i.e., ($|\theta_1-360°|<\theta_2$)), the controller 230 can compensate for the first mechanical angle ($\theta_1$). That is, the controller 230 subtracts 360° from the first mechanical angle. Therefore, as shown in Equation 3, an average of the compensated first and second mechanical angles is determined to be a maximum speed mechanical angle.

In addition, if a difference value between the first mechanical angle and the angle of 360° is higher than the second mechanical angle (i.e., ($|\theta_1-360°|>\theta_2$)), the controller 230 can compensate for the second mechanical angle ($\theta_2$). That is, the controller 230 adds 360° to the second mechanical angle. Therefore, as shown in Equation 4, an average of the compensated first and second mechanical angles is determined to be a maximum speed mechanical angle.

In the meantime, although not shown in FIG. 6, the controller 230 may further include another step for determining whether the motor is stably driven.

For example, as shown in FIG. 5(a), the controller 230, before calculating the first and second mechanical angles, determines mechanical angles at Pa and Pb corresponding to different reference speeds (vr1 and vr2). If the range of the determined mechanical angles is within an allowed range, the controller 230 may determine stable speed. Otherwise, before calculating the first and second mechanical angles, the controller 230 estimates the speed ripple, and analyzes components of the corresponding speed ripple. In this case, if the range of the analyzed mechanical angles is not within the allowed range, the controller 230 may determine unstable speed as necessary.

Figure 9:
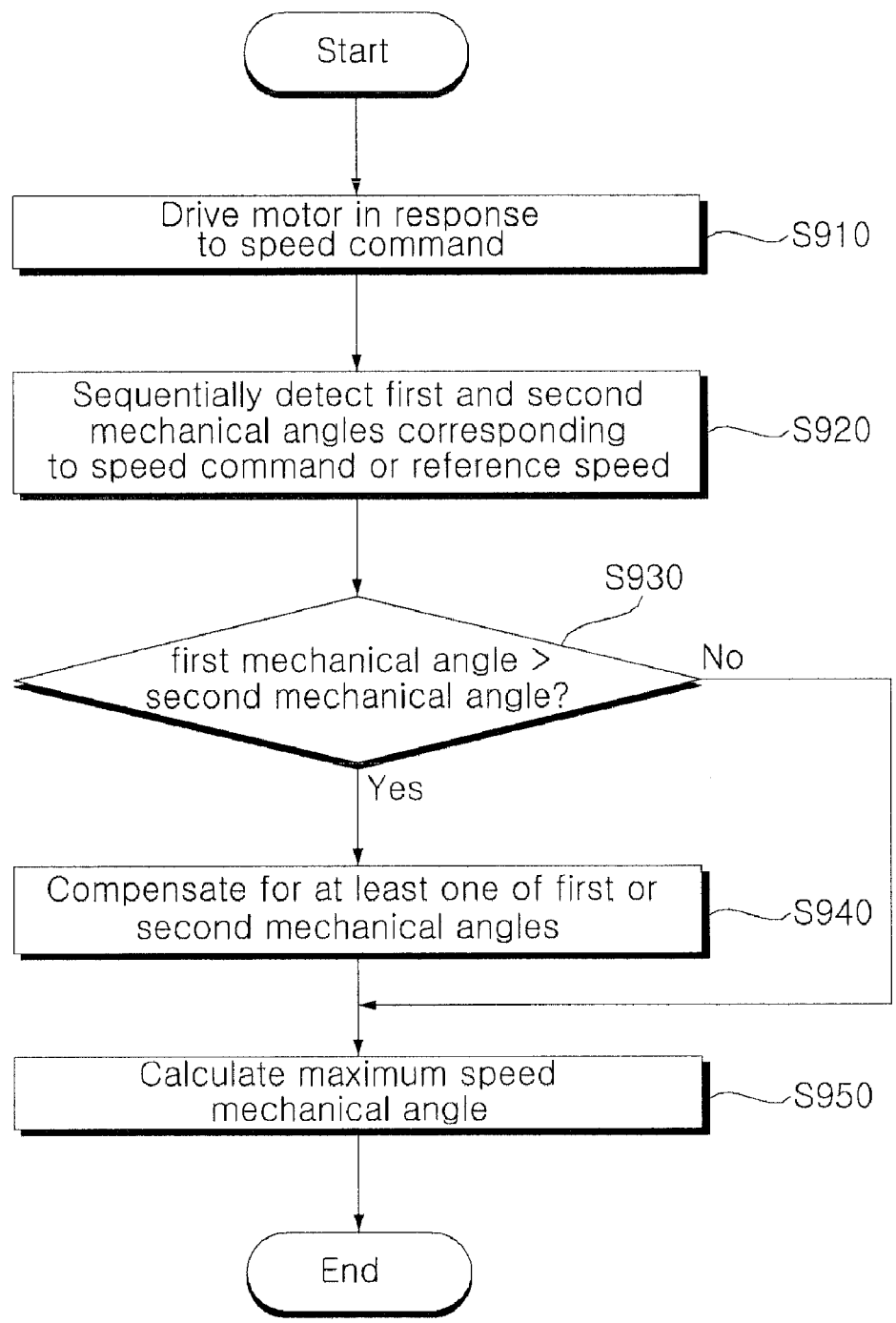
FIG. 9 is a flowchart illustrating a method for driving a motor of an air conditioner according to another embodiment of the present invention.

FIG. 9 is a flowchart illustrating a method for driving a motor of an air conditioner according to another embodiment of the present invention.

Figure 4:
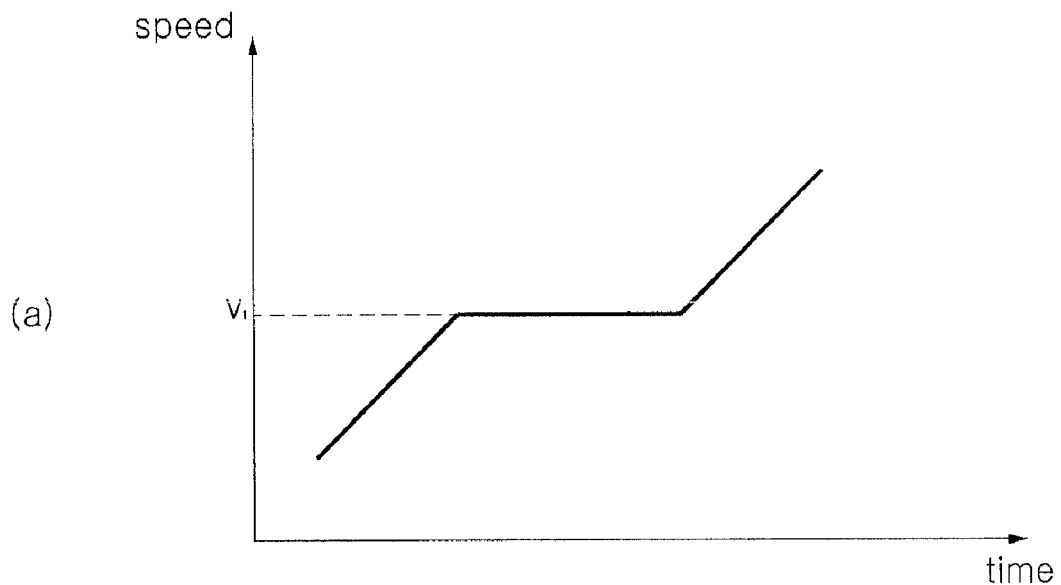
FIGS. 4(a) and 4(b) are graphs illustrating load torque varying with a motor speed.
Figure 4:
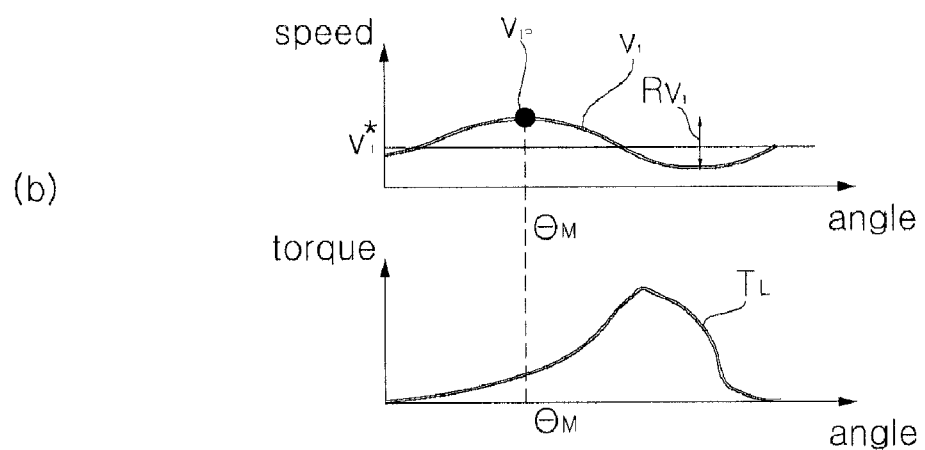

Referring to FIG. 9, the controller 230 controls the motor 250 to be driven in response to the speed command (v*) at step S910. For example, as shown in FIG. 4, the controller 230 controls the motor 250 to be driven by a command of a predetermined speed corresponding to a halt frequency (about 35 Hz). Therefore, the controller 230 outputs the corresponding inverter switching control signal (Sic) to the inverter 220.

Next, the controller 230 sequentially detects the first and second mechanical angles in response to a speed command or a reference speed spaced apart from the speed command by a predetermined range at step S1020. As shown in FIG. 5, by means of the reference speed (vr1) spaced apart from the speed command (v*1) by a predetermined range, the controller 230 detects first and second mechanical angles at P1 and P2 corresponding to the reference speed (vr1). Such detection of the first and second mechanical angles may be carried out by the estimation unit 305 and the torque compensation unit 325.

Next, the controller 230 determines whether the first mechanical angle is higher than the second mechanical angle at step S930. If the second mechanical angle is higher than the first mechanical angle, this means a normal state, such that the controller 230 can calculate a maximum speed mechanical angle using an average of the first and second mechanical angles.

Otherwise, if the first mechanical angle is higher than the second mechanical angle, this means an abnormal state, such that the controller 230 compensates for either one of the first and second mechanical angles at step S940.

Thereafter, the controller 230 calculates the maximum speed mechanical angle ($\theta_M$) on the basis of the compensated first and second mechanical angles.

In response to the calculated maximum speed mechanical angle ($\theta_M$), the controller 230 (especially, the torque compensation unit 325) performs the corresponding load torque compensation. For example, the calculated maximum speed mechanical angle ($\theta_M$) is matched to a minimum value from among the predetermined load torque patterns, and the controller 230 may output the compensation current command value (i*c) in response to the corresponding load torque pattern. As a result, the speed ripple caused by specific load can be effectively removed.

On the other hand, although not shown in FIG. 9, if required, the controller 230 may further include a step for determining whether the motor is stably driven.

For example, as shown in FIG. 5(a), before calculating the first and second mechanical angles, the controller 230 determines mechanical angles at Pa and Pb corresponding to different reference speeds (vr1 and vr2). If the range of the determined mechanical angles is within the allowed range, the controller 230 may determine stable speed. Otherwise, before calculating the first and second mechanical angles, the controller 230 estimates the speed ripple, and analyzes components of the corresponding speed ripple. In this case, if the range of the analyzed mechanical angles is not within the allowed range, the controller 230 may determine unstable speed as necessary.

Figure 10:
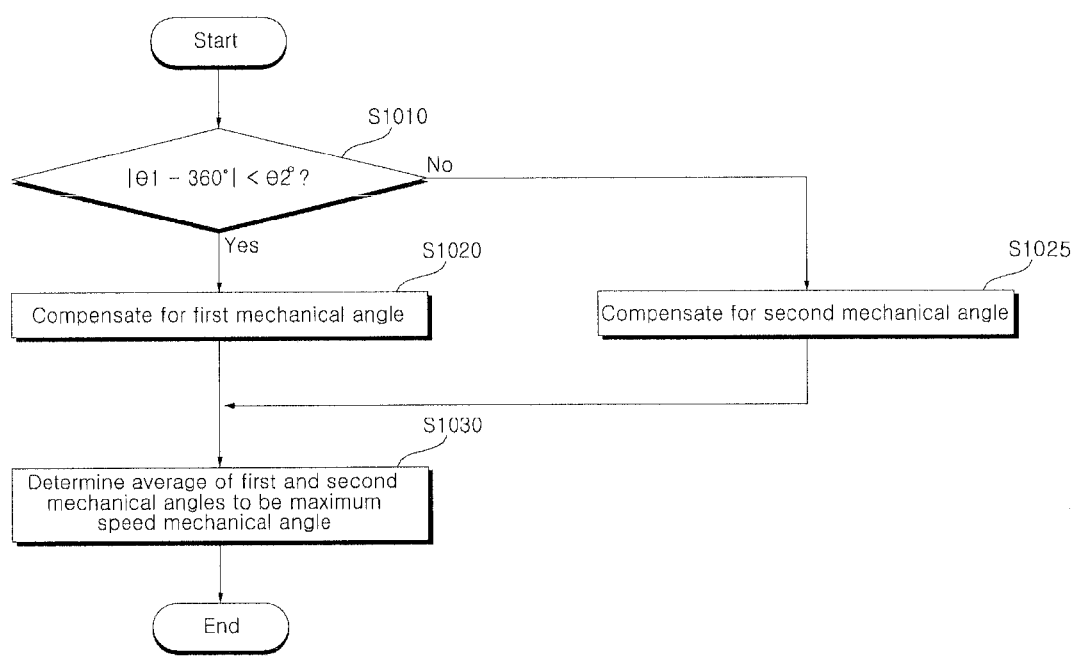
FIG. 10 is a flowchart illustrating a method for calculating a maximum speed mechanical angle shown in FIG. 9.

FIG. 10 is a flowchart illustrating a method for calculating a maximum speed mechanical angle shown in FIG. 9.

Referring to FIG. 10, if the first mechanical angle is higher than the second mechanical angle at step S930 in FIG. 9, a maximum speed mechanical angle can be calculated using steps of FIG. 10.

First, the controller 230 determines whether a difference value between the first mechanical angle and the angle of 360° is less than the second mechanical angle (i.e., $|\theta_1-360°|<\theta_2$)) at step S1010. If the relationship of $|\theta_1-360°|<\theta_2$) is satisfied at step s1010, the controller 230 compensates for the first mechanical angle ($\theta_1$) at step S1020. That is, the controller 230 subtracts 360° from the first mechanical angle ($\theta_1$).

Therefore, as shown in Equation 3, the controller 230 calculates an average of the compensated first and second mechanical angles as a maximum speed mechanical angle at step S1030.

Thereafter, the controller 230 determines whether a difference value between the first mechanical angle and the angle of 360° is higher than the second mechanical angle (i.e., $|\theta_1-360°|>\theta_2$)) at step S1030. If the relationship of $|\theta_1-360°|>\theta_2$) is satisfied at step s1030, the controller 230 compensates for the second mechanical angle ($\theta_2$) at step S1025. That is, the controller 230 adds 360° to the second mechanical angle ($\theta_2$).

Therefore, as shown in Equation 4, the average of the compensated first and second mechanical angles is calculated as the maximum speed mechanical angle at step S1030.

Figure 11:
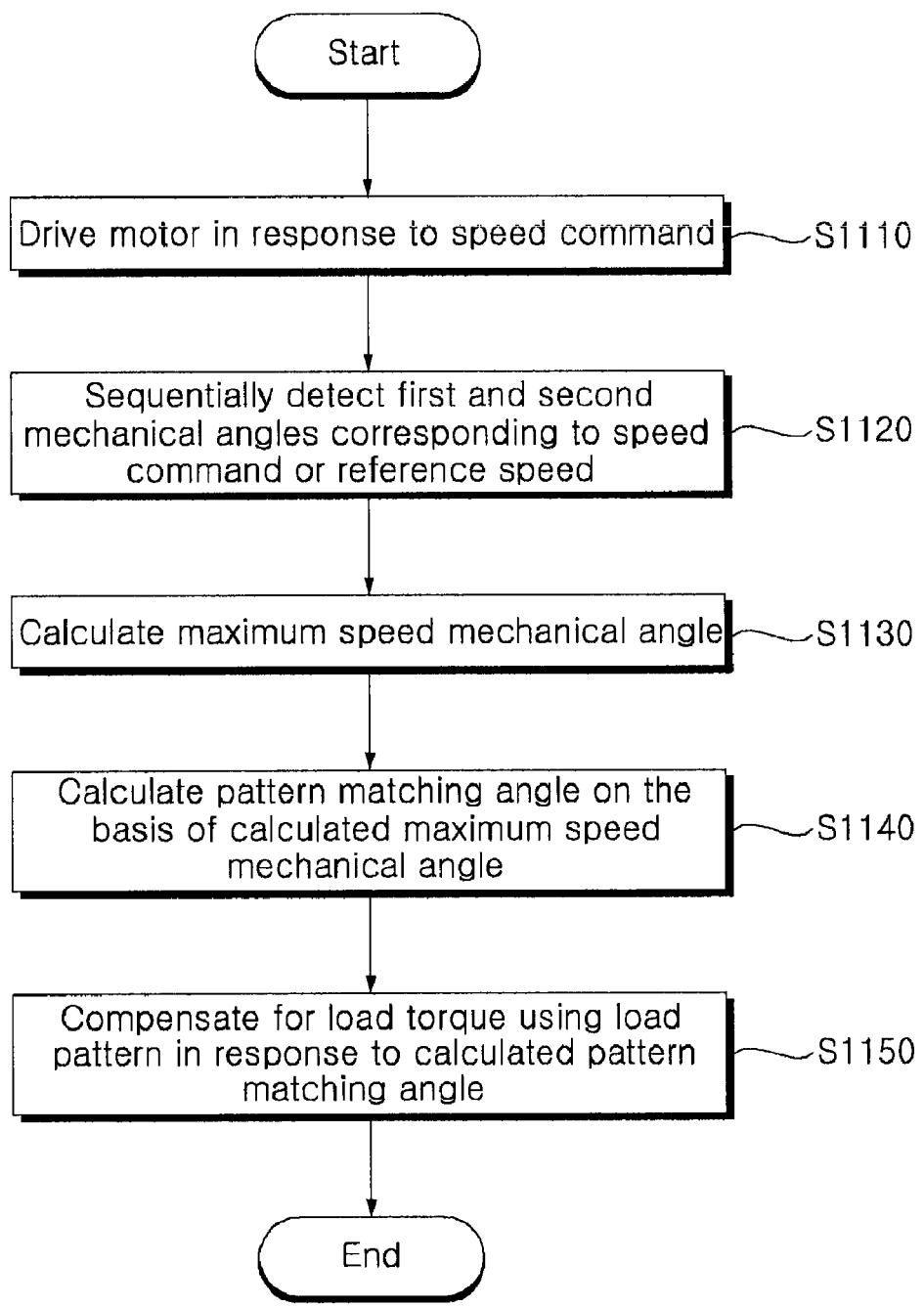
FIG. 11 is a flowchart illustrating a method for driving a motor of an air conditioner according to another embodiment of the present invention.
Figure 12:
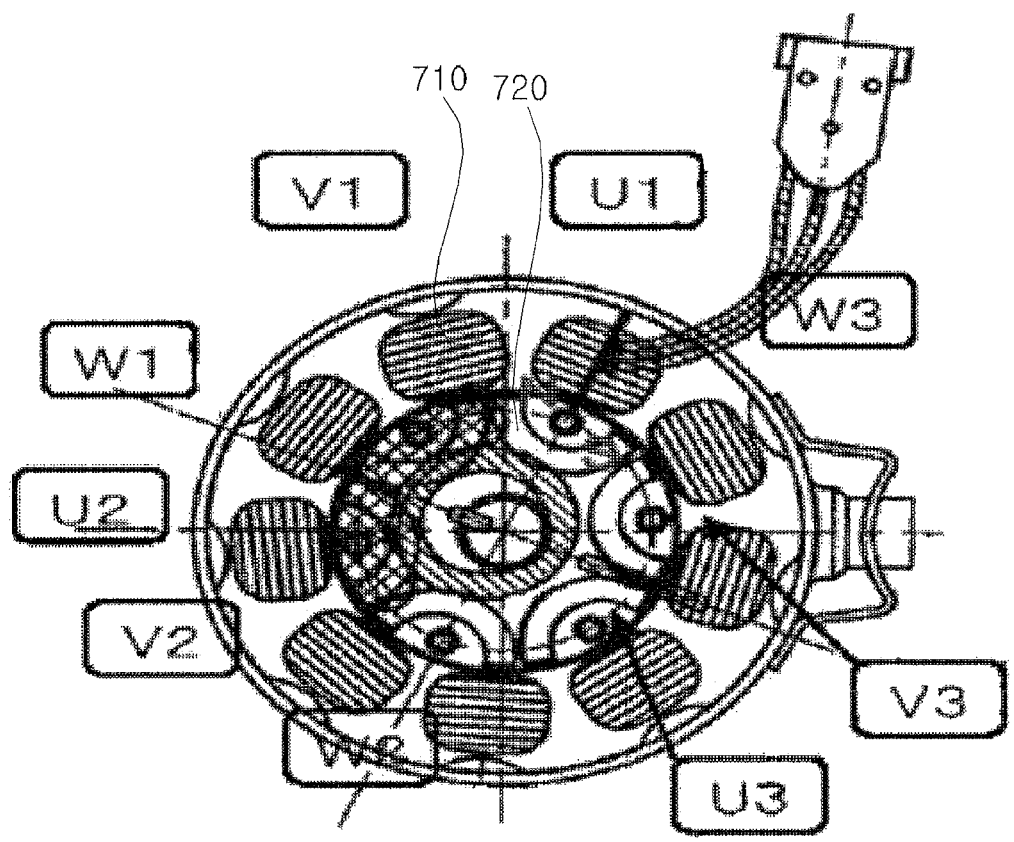
FIGS. 12 and 13 show the driving method shown in FIG. 11.
Figure 13:
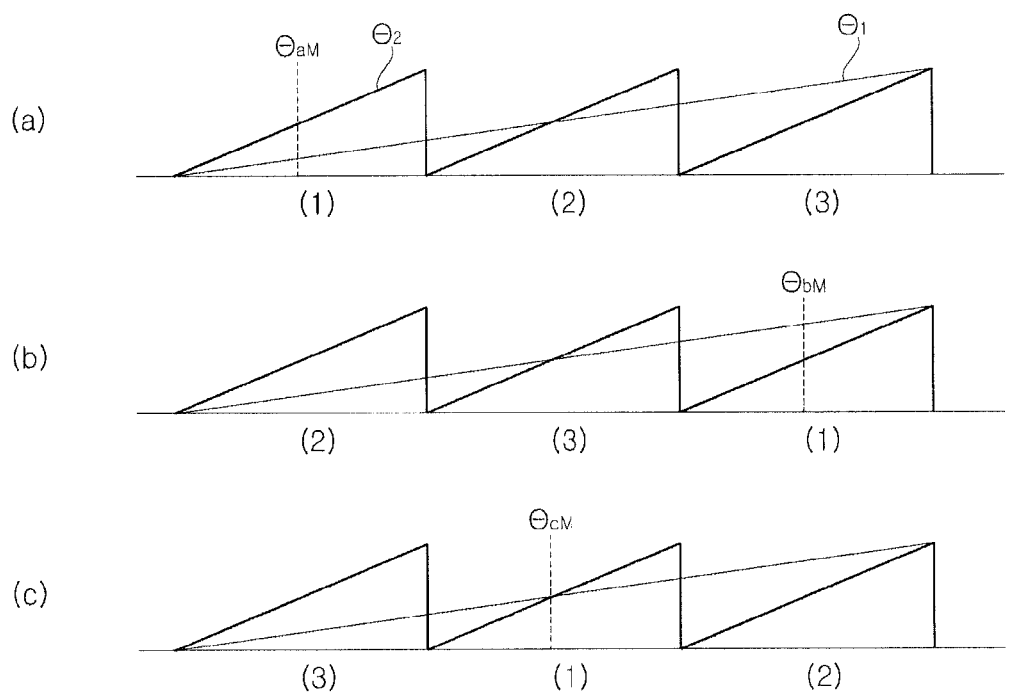

FIG. 11 is a flowchart illustrating a method for driving a motor of an air conditioner according to another embodiment of the present invention. FIGS. 12 and 13 show the driving method shown in FIG. 11.

Referring to FIG. 11, the controller 230 controls the motor 250 to be driven in response to the speed command (v*) at step S1110. For example, as shown in FIG. 4, the controller 230 controls the motor 250 to be driven by a command of a predetermined speed corresponding to a halt frequency (about 35 Hz). Therefore, the controller 230 outputs the corresponding inverter switching control signal (Sic) to the inverter 220.

Next, the controller 230 sequentially detects the first and second mechanical angles in response to a speed command or a reference speed spaced apart from the speed command by a predetermined range at step S1120. As shown in FIG. 5, by means of the reference speed (vr1) spaced apart from the speed command (v*1) by a predetermined range, the controller 230 detects first and second mechanical angles at P1 and P2 corresponding to the reference speed (vr1). Such detection of the first and second mechanical angles may be carried out by the estimation unit 305 and the torque compensation unit 325.

Next, the controller 230 calculates the maximum speed mechanical angle ($\theta_M$) at step S1130. As shown in Equation 2, the maximum speed mechanical angle ($\theta_M$) can be calculated as an average of the first and second mechanical angles.

The controller 230 calculates the pattern matching angle in response to the calculated maximum speed mechanical angle ($\theta_M$) at step S1140.

For example, the controller 230 (especially, the torque compensation unit 325), using the maximum speed mechanical angle ($\theta_M$) and the predetermined matching angle ($\theta_{dm}$), calculates a pattern matching compensation angle ($\theta_c$) causing a minimal speed ripple, and calculates the final pattern matching compensation angle ($\theta_{fm}$) in response to the predetermined pattern matching angle ($\theta_{dm}$) and the pattern matching compensation angle ($\theta_c$).

FIG. 12 is a view illustrating the internal configuration of a three-phase motor. A stator coil 710 and a rotor magnet 720 are shown in FIG. 12. The motor shown in FIG. 12 is a three-phase motor having 6 poles, and the region of the motor is divided into a first area (u1, v1, w1), a second area (u2, v2, w2), and a third area (u3, v3, w3).

In the 6-pole three-phase motor shown in FIG. 12, the maximum speed mechanical angle ($\theta_M$) may be arranged in three areas of the electrical angle. FIG. 13 shows three areas of the electrical angle.

Referring to FIG. 13, although the calculated maximum speed mechanical angle ($\theta_{aM}$) is arranged in the first area (u1, v1, w1), the corresponding electrical angle may be arranged in different areas as shown in FIGS. 13(a), 13(b), and 13(c).

In accordance with the embodiment of the present invention, in first to third cases such as FIGS. 13(a), 13(b) and 13(c), individual predetermined matching angles are established, and a pattern matching compensation angle causing a minimal speed ripple is calculated.

For example, if the maximum speed mechanical angle ($\theta_M$) is in the range from 0° to 120°, this case corresponds to the first case (FIG. 13(a)), and a predetermined matching angle may be set to (240°+B). In this case, a compensation value is changed within the predetermined range from the predetermined matching angle (240°+B), such that the speed ripple is calculated using the changed compensation value. The compensation value causing the minimal speed ripple is calculated as the pattern matching compensation angle ($\alpha$). As a result, the final pattern matching angle may be set to (240°+B+$\alpha$).

Next, if the maximum speed mechanical angle ($\theta_M$) is in the range from 240° to 0°, this case corresponds to the second case (FIG. 13(b)), and a predetermined matching angle may be set to (120°+B). In this case, a compensation value is changed within the predetermined range from the predetermined matching angle (120°+B), such that the speed ripple is calculated using the changed compensation value. The compensation value causing the minimal speed ripple is calculated as the pattern matching compensation angle ($\beta$). As a result, the final pattern matching angle may be set to (120°+B+$\beta$).

Next, if the maximum speed mechanical angle ($\theta_M$) is in the range from 120° to 240°, this case corresponds to the third case (FIG. 13(c)), and a predetermined matching angle may be set to (B). In this case, a compensation value is changed within the predetermined range from the predetermined matching angle (B), such that the speed ripple is calculated using the changed compensation value. The compensation value causing the minimal speed ripple is calculated as the pattern matching compensation angle ($\gamma$). As a result, the final pattern matching angle may be set to (B+$\gamma$).

On the other hand, as described above, there is a phase difference of 120° among the predetermined matching angles of the individual cases, such that it is possible for the controller 230 to calculate the predetermined matching angle of another case using the predetermined matching angle of any one of the cases.

Thereafter, the controller 230 compensates for load torque using a load pattern in response to the calculated pattern matching angle at step S1150. The controller 230 (especially, the torque compensation unit 325) performs matching of a predetermined load torque pattern in response to the calculated pattern matching angle, and outputs the compensation current command value (i*c) in response to the corresponding load torque pattern. Therefore, the current command generator 310 adds the output current command values (i*d and i*q) and the aforementioned compensation current command value (i*c), generates the final current command value, and outputs it. Therefore, a current command for compensating for load torque is changed, such that the voltage commands (v*d and v*q) and the output signal (Sic) of the switching control signal output unit are changed.

Therefore, the controller 230 calculates the pattern matching angle in response to the calculated maximum speed mechanical angle during the constant speed operation, such that it can decrease the speed ripple. Especially, the controller 230 calculates the pattern matching compensation angle causing a minimal speed ripple using the predetermined matching angle, such that it can greatly reduce the speed ripple. In addition, if the speed ripple is increased by an assembly error between the compressor and the motor, the controller 230 can greatly reduce the speed ripple using the pattern matching compensation angle.

On the other hand, although not shown in FIG. 11, another step for correcting the detected first and second mechanical angles may be inserted between the step S1120 and the step S1130, such that the controller 230 may further perform the aforementioned step.

For example, in relation to the sequentially detected first and second mechanical angles, if the second mechanical angle is higher than the first mechanical angle, this means a normal state. As shown in Equation 2, the controller 230 calculates the maximum speed mechanical angle using an average of the first and second mechanical angles.

Thereafter, if the first mechanical angle is higher than the second mechanical angle, this means an abnormal state, such that the controller 230 can compensate for either one of the first and second mechanical angles. The controller 230 can calculate a maximum speed mechanical angle ($\theta_M$) on the basis of the compensated first and second mechanical angles.

For example, if a difference value between the first mechanical angle and the angle of 360° is less than the second mechanical angle (i.e., ($|\theta_1 - 360°| < \theta_2$)), the controller 230 may compensate for the first mechanical angle ($\theta_1$). That is, the controller 230 subtracts 360° from the first mechanical angle ($\theta_1$). Therefore, as shown in Equation 3, an average of the compensated first and second mechanical angles can be calculated as a maximum speed mechanical angle.

In addition, if a difference value between the first mechanical angle and the angle of 360° is higher than the second mechanical angle (i.e., ($|\theta_1 - 360°| > \theta_2$)), the controller 230 may compensate for the second mechanical angle ($\theta_2$). That is, the controller 230 adds 360° to the second mechanical angle ($\theta_2$). Accordingly, as shown in Equation 4, an average of the compensated first and second mechanical angles may be calculated as a maximum speed mechanical angle.

On the other hand, although not shown in FIG. 11, the controller 230 may further include a step for determining whether the motor is stably driven as necessary.

For example, as shown in FIG. 5(*a*), before calculating the first and second mechanical angles, the controller 230 determines mechanical angles at Pa and Pb corresponding to different reference speeds (vr1 and vr2). If the range of the mechanical angles is within an allowed range, the controller 230 may determine stable speed. Otherwise, before calculating the first and second mechanical angles, the controller 230 estimates the speed ripple, and analyzes components of the corresponding speed ripple. If the analyzed result is not within the allowed range, the controller 230 may determine unstable speed as necessary.

As is apparent from the above description, the apparatus or method for driving the motor of the air conditioner according to the present invention performs matching of a load pattern table in response to a maximum speed mechanical angle calculated during the constant speed operation, such that it can calculate an optimum load pattern table causing a minimum speed ripple from among a plurality of load pattern tables.

Therefore, the motor driving apparatus or method according to the present invention can simply and greatly decrease the speed ripple caused by load torque during the constant speed operation.

In addition, the motor driving apparatus or method according to the present invention determines whether an abnormal state occurs in a plurality of sequentially calculated mechanical angles, and corrects the abnormal state, such that a maximum speed mechanical angle can be correctly calculated during the constant speed operation.

On the other hand, the apparatus or method for driving the motor of the air conditioner according to the embodiment of the present invention can determine whether an abnormal state occurs in a plurality of mechanical angles sequentially calculated during the constant speed operation, and corrects the abnormal state, such that a maximum speed mechanical angle can be correctly calculated during the constant speed operation.

Therefore, in the case of compensating for load torque, a predetermined pattern can be correctly applied to the load torque compensation. As a result, the speed ripple caused by load torque can be simply and largely decreased during the constant speed operation.

Meanwhile, the apparatus or method for driving the motor of the air conditioner according to the embodiment of the present invention calculates a pattern matching angle in response to the maximum speed mechanical angle calculated during the constant speed operation, resulting in reduction of the speed ripple.

Specifically, the apparatus or method for driving the motor of the air conditioner calculates a pattern matching compensation angle having a minimum speed ripple using a predetermined matching angle, resulting in reduction of the speed ripple.

In addition, the apparatus or method for driving the motor of the air conditioner according to the embodiment of the present invention uses a pattern matching compensation angle although the speed ripple is increased owing to an assembly error between the compressor and the motor, such that it can greatly decrease the speed ripple.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for driving a motor of an air conditioner, comprising:
   driving the motor in response to a predetermined speed command;
   sequentially detecting first and second mechanical angles in response to the speed command or a reference speed spaced apart from the speed command by a predetermined range;
   calculating a maximum speed mechanical angle corresponding to a maximum speed ripple of the motor on the basis of the detected first and second mechanical angles;

compensating for load torque of the motor on the basis of the calculated maximum speed mechanical angle; and calculating a pattern matching angle on the basis of the maximum speed mechanical angle, wherein the compensating for load torque of the motor compensates for load torque of the motor in response to the calculated pattern matching angle, and drives the motor using the compensated load torque.

2. The method according to claim 1, further comprising:
selecting an optimum load pattern table causing a minimal speed ripple in response to the maximum speed mechanical angle from among a plurality of load torque patterns, wherein the compensating for load torque of the motor compensates for load torque of the motor in response to the selected load pattern table, and drives the motor using the compensated load torque.

3. The method according to claim 1, further comprising =
correcting at least one of the first or second mechanical angles, wherein the calculating of the maximum speed mechanical angle calculates the maximum speed mechanical angle on the basis of the at least one of the corrected first or second mechanical angles.

4. The method according to claim 1, further comprising:
determining whether a first mechanical angle is higher than a second mechanical angle, wherein the calculating of the maximum speed mechanical angle compensates for at least one of the first or second mechanical angles if the first mechanical angle is higher than the second mechanical angle, and calculates the maximum speed mechanical angle corresponding to a maximum speed ripple of the motor on the basis of the compensated first or second mechanical angles.

5. The method according to claim 1, wherein the calculating of the pattern matching angle includes:
calculating a pattern matching compensation angle causing a minimal speed ripple using the maximum speed mechanical angle and a predetermined matching angle; and
calculating a final pattern matching angle in response to the predetermined matching angle and the pattern matching compensation angle.

6. The method according to a claim 1, further comprising:
determining whether a first mechanical angle is higher than a second mechanical angle, wherein the calculating of the maximum speed mechanical angle compensates for at least one of the first or second mechanical angles if the first mechanical angle is higher than the second mechanical angle, and calculates the maximum speed mechanical angle corresponding to a maximum speed ripple of the motor on the basis of the compensated first or second mechanical angles.

7. The method according to claim 1, wherein the calculating of the maximum speed mechanical angle includes:
if the detected first mechanical angle is higher than the second mechanical angle, calculating the maximum speed mechanical angle by an average of the compensated first and second mechanical angles; and
if the detected second mechanical angle is higher than the first mechanical angle, calculating the maximum speed mechanical angle by an average of the detected first and second mechanical angles.

8. The method according to claim 1, wherein the calculating of the maximum speed mechanical angle includes:
if the detected first mechanical angle is higher than the second mechanical angle and a difference value between the first mechanical angle and an angle of 360° is less than the second mechanical angle, compensating for the first mechanical angle; and
if the detected first mechanical angle is higher than the second mechanical angle and a difference value between the first mechanical angle and an angle of 360° is higher than the second mechanical angle, compensating for the second mechanical angle.

9. An apparatus for driving a motor for use in an air conditioner, comprising:
a motor;
an inverter that includes a plurality of switching elements, outputs AC power having a predetermined frequency and a predetermined magnitude by a switching operation of the switching elements, and drives the motor; and
a controller configured to drive the motor in response to a predetermined speed command, sequentially detect first and second mechanical angles in response to the speed command or a reference speed spaced apart from the speed command by a predetermined range, calculate a maximum speed mechanical angle corresponding to a maximum speed ripple of the motor on the basis of the detected first and second mechanical angles, and compensate for load torque of the motor on the basis of the calculated the maximum speed mechanical angle, wherein the controller calculates a pattern matching angle on the basis of the maximum speed mechanical angle, and compensates for load torque of the motor in response to the calculated pattern matching angle, and drives the motor using the compensated load torque.

10. The apparatus according to claim 9, wherein the controller selects an optimum load pattern table causing a minimal speed ripple in response to the maximum speed mechanical angle from among a plurality of load torque patterns, and compensates for load torque of the motor in response to the selected load pattern table, and drives the motor using the compensated load torque.

11. The apparatus according to claim 9, wherein the controller corrects at least one of the first or second mechanical angles, and calculates the maximum speed mechanical angle on the basis of the at least one of the corrected first or second mechanical angles.

12. The apparatus according to claim 9, wherein the controller determines whether a first mechanical angle is higher than a second mechanical angle, and compensates for at least one of the first or second mechanical angles if the first mechanical angle is higher than the second mechanical angle, and calculates the maximum speed mechanical angle corresponding to a maximum speed ripple of the motor on the basis of the compensated first or second mechanical angles.

13. The apparatus according to claim 9, wherein the controller includes:
an estimator configured to estimate a speed of the motor on the basis of an output current flowing in the motor;
a torque compensator configured to calculate a maximum speed mechanical angle on the basis of a motor's mechanical angle estimated by the estimator, select an optimum load pattern table causing a minimal speed ripple in response to the maximum speed mechanical angle from among the load torque patterns, compensate for load torque of the motor in response to the selected load pattern table, and generate a compensation current command value;
a current command generator configured to generate a current command value on the basis of the estimated speed and the speed command value, generate a final current command value using the current command value and the compensation current command value, and output the final current command value;

a voltage command generator configured to generate a voltage current value on the basis of the current command value and the detected output current; and a switching control signal output generator configured to generate the inverter switching control signal on the basis of the voltage command value.

* * * * *